(12) United States Patent
Ransome et al.

(10) Patent No.: US 7,764,655 B2
(45) Date of Patent: Jul. 27, 2010

(54) LOCAL AREA NETWORK UTILIZING MACRO AND MICRO DIVERSITY TECHNIQUES IN RECEIVING SIGNALS FROM CELL SITES

(75) Inventors: Peter David Ransome, Le Grand Saconnex (CH); James Laurence Taylor, Epone (FR); Peter Paul Smyth, Newbourne (GB)

(73) Assignee: NEXTG Networks, Inc., San Jose, CA (US)

( * ) Notice: Subject to any disclaimer, the term of this patent is extended or adjusted under 35 U.S.C. 154(b) by 389 days.

(21) Appl. No.: 10/551,069

(22) PCT Filed: Mar. 30, 2004

(86) PCT No.: PCT/US2004/009734
§ 371 (c)(1),
(2), (4) Date: Sep. 27, 2005

(87) PCT Pub. No.: WO2004/093471
PCT Pub. Date: Oct. 28, 2004

(65) Prior Publication Data
US 2006/0182072 A1    Aug. 17, 2006

(30) Foreign Application Priority Data
Mar. 31, 2003    (GB) .................................. 0307434.1

(51) Int. Cl.
| | |
|---|---|
| *H04W 4/00* | (2009.01) |
| *H04W 72/00* | (2009.01) |
| *H04B 7/216* | (2006.01) |
| *H04B 7/00* | (2006.01) |
| *H04J 3/22* | (2006.01) |
| *H04L 27/00* | (2006.01) |
| *H04L 1/02* | (2006.01) |

(52) U.S. Cl. ................. 370/334; 370/338; 370/330; 370/335; 370/342; 370/465; 455/524; 455/525; 455/452.1; 375/299; 375/347

(58) Field of Classification Search ................. 370/334, 370/338, 328, 330, 335, 342, 465; 455/524, 455/525, 533.1, 876, 452.1; 375/299, 347
See application file for complete search history.

(56) References Cited

U.S. PATENT DOCUMENTS

| | | | | |
|---|---|---|---|---|
| 5,303,287 | A | * | 4/1994 | Laborde .................... 455/426.1 |
| 5,329,555 | A | * | 7/1994 | Marko et al. ................. 375/347 |
| 5,634,206 | A | * | 5/1997 | Reed et al. ................. 455/277.2 |
| 5,640,678 | A | * | 6/1997 | Ishikawa et al. ............. 455/449 |
| 6,067,290 | A | * | 5/2000 | Paulraj et al. ................ 370/329 |
| 6,112,058 | A | * | 8/2000 | Walters et al. ............ 455/67.11 |

(Continued)

*Primary Examiner*—Vincent P Harper
*Assistant Examiner*—Ariel Balaoing
(74) *Attorney, Agent, or Firm*—Vierra Magen Marcus & DeNiro LLP

(57) ABSTRACT

A communications network comprises two or more cell sites for communication with wireless terminals. At least one of the cell sites has multiple receive antennas. A central site has one or more interface controllers and a switch system through which the controllers are connected to the cell sites. For each controller in communication with a wireless terminal, a cell site is selected for reception of signals from the terminal, and for each selected cell site having more than one receive antenna, an antenna within the site is selected for reception from the terminal.

16 Claims, 6 Drawing Sheets

U.S. PATENT DOCUMENTS

Figure 1:
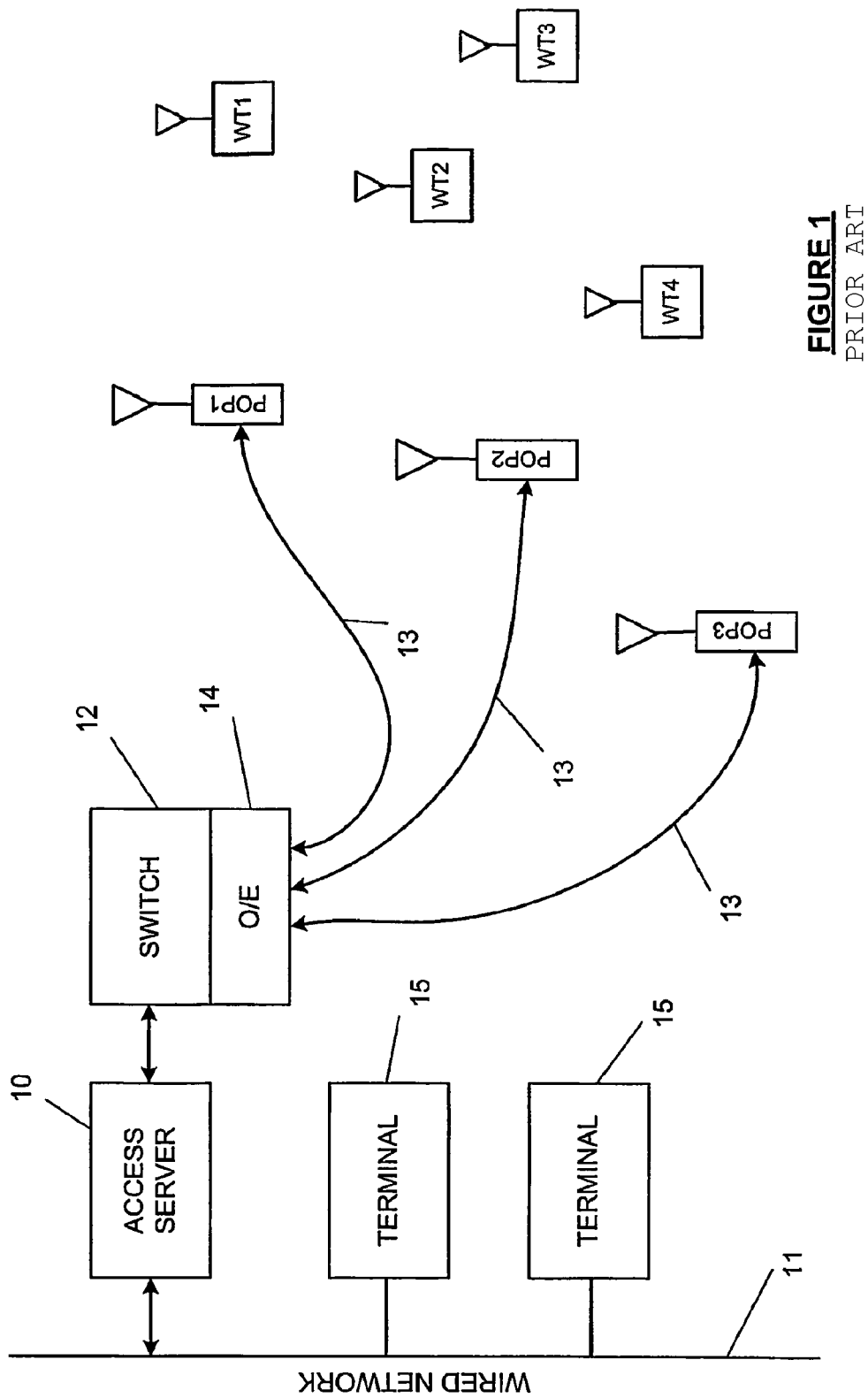

| | | | |
|---|---|---|---|
| 6,141,392 A * | 10/2000 | Hoshikuki et al. | 375/347 |
| 6,408,169 B1 * | 6/2002 | Pallonen | 455/277.2 |
| 7,006,465 B2 * | 2/2006 | Toshimitsu et al. | 370/328 |
| 2001/0004604 A1 * | 6/2001 | Toshimitsu et al. | 455/562 |
| 2001/0030948 A1 * | 10/2001 | Tiedemann, Jr. | 370/305 |
| 2004/0047324 A1 * | 3/2004 | Diener | 370/338 |
| 2004/0162037 A1 * | 8/2004 | Shpak | 455/101 |
| 2004/0258023 A1 * | 12/2004 | Sakamoto et al. | 370/331 |

* cited by examiner

LOCAL AREA NETWORK UTILIZING MACRO AND MICRO DIVERSITY TECHNIQUES IN RECEIVING SIGNALS FROM CELL SITES

FIELD OF THE INVENTION

This invention relates to diversity in wireless networks, and in particular to implementations of macro and micro diversity at a distributed access point in a wireless LAN. The network may implement a range of wireless protocols such as IEEE 802.11a and 802.11b for terminals communicating through the access point.

BACKGROUND TO THE INVENTION

Wireless LANs (local area networks) are emerging as important infrastructure for a wide range of commercial and domestic premises. They enable mobility of wireless devices about the premises and are generally more flexible and lower cost than networks with equivalent wired connections. However, a large number of wireless access points may be required to properly serve the coverage volume of a particular network, and different mobile devices may require service within the volume using different wireless protocols. This increases the number of wireless interface controllers with RF (radio frequency) transceivers that are required by the network, and therefore increases its cost. Distributed access points having a number of relatively simple cells or POPs (points of presence) for transmission and reception of RF signals are therefore under development. Each access point has a central server with a set of transceivers that are typically connected to the POPs by optical fibres, coaxial cables or the like, through a bridge or switch.

Diversity techniques can improve wireless communication by selecting one channel, or combining a subset of channels, from a range of decorrelated channels that may exist between a transmitter and a receiver. A range of different algorithms exist for selecting or combining signals from among the available channels. In spatial diversity each channel is a physical path between a transmitting antenna and a receiving antenna, with selection of the most suitable receiving antenna according to analysis of the respective signal. Macro diversity counters large scale and generally static spatial variations between the receiving antennae such as shadowing. Micro diversity counters relatively small scale and often time varying effects such as multipath fading. Both macro and micro spatial effects can be important in wireless LANs with distributed access points.

SUMMARY OF THE INVENTION

It is therefore an object of the invention to provide for the use of spatial diversity techniques in wireless LANs having distributed access points, or at least to provide an alternative to existing diversity systems in wireless networks.

In one aspect the invention may broadly be said to consist in a communications network comprising: two or more cell sites for communication with wireless terminals, at least one of the cell sites having multiple receive antennas; and a central site having one or more interface controllers and a switch system through which the controllers are connected to the cell sites; wherein for each controller in communication with a wireless terminal, a cell site is selected for reception of signals from the terminal, and for each selected cell site having more than one receive antenna, an antenna within the site is selected for reception from the terminal.

Preferably the network further comprises: a cell selector in the central site that uses a diversity technique to select cell sites for reception from the wireless terminals and connects the selected sites to respective controllers through the switch. Preferably the network further comprises: an antenna selector in each controller that uses a diversity technique to select an antenna within each cell site having multiple receive antennas. Preferably the interface controllers include transceivers that transmit and receive RF signals according to respective protocols that are used by the wireless terminals, and preferably the central site is connected to at least some of the cell sites via optical fibres.

The invention may also be said to consist in any alternative combination of features that are suggested in this specification of the drawings. All equivalents of these features are deemed to be included whether or not explicitly set out.

LIST OF FIGURES

Figure 2:
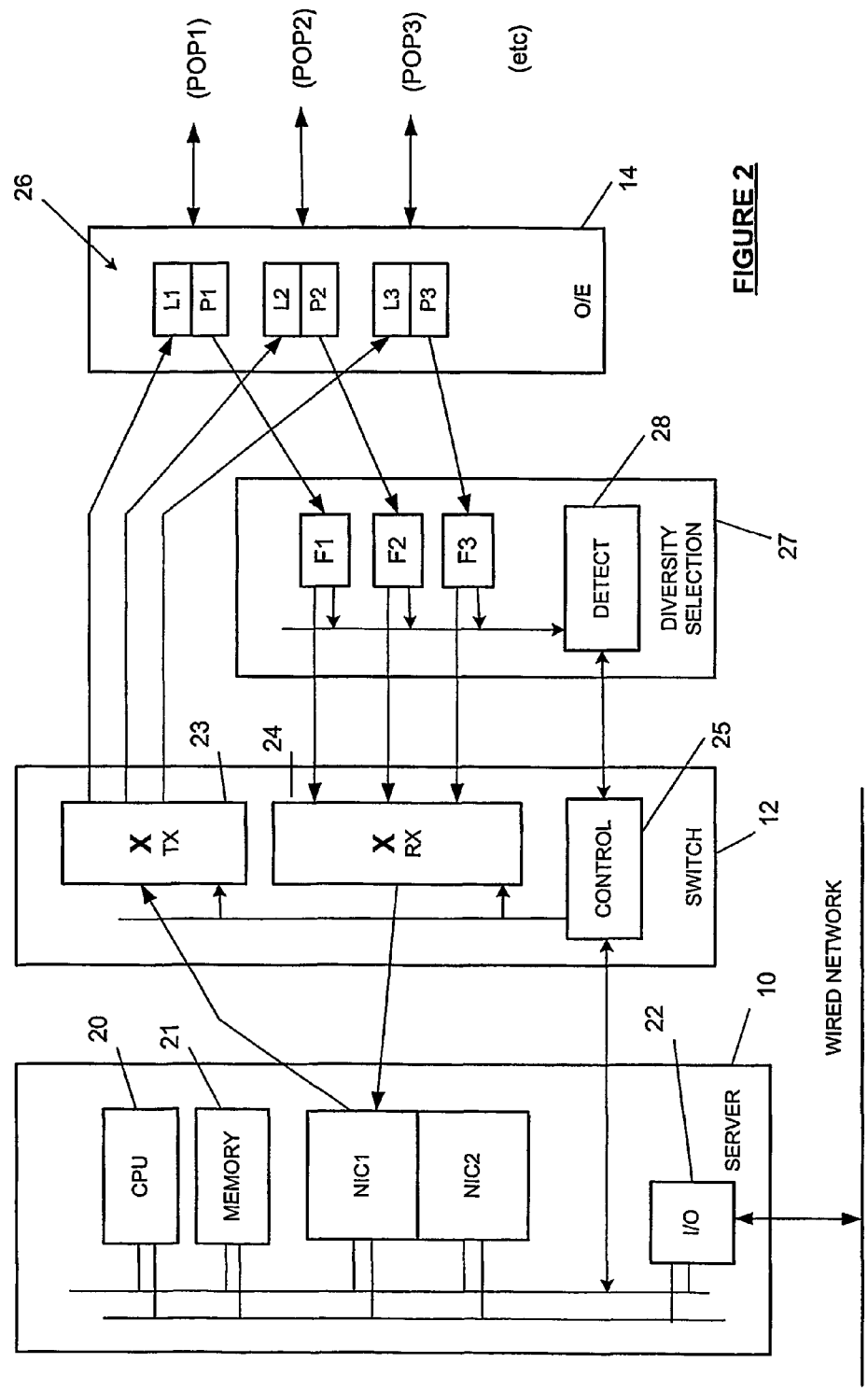
Figure 3:
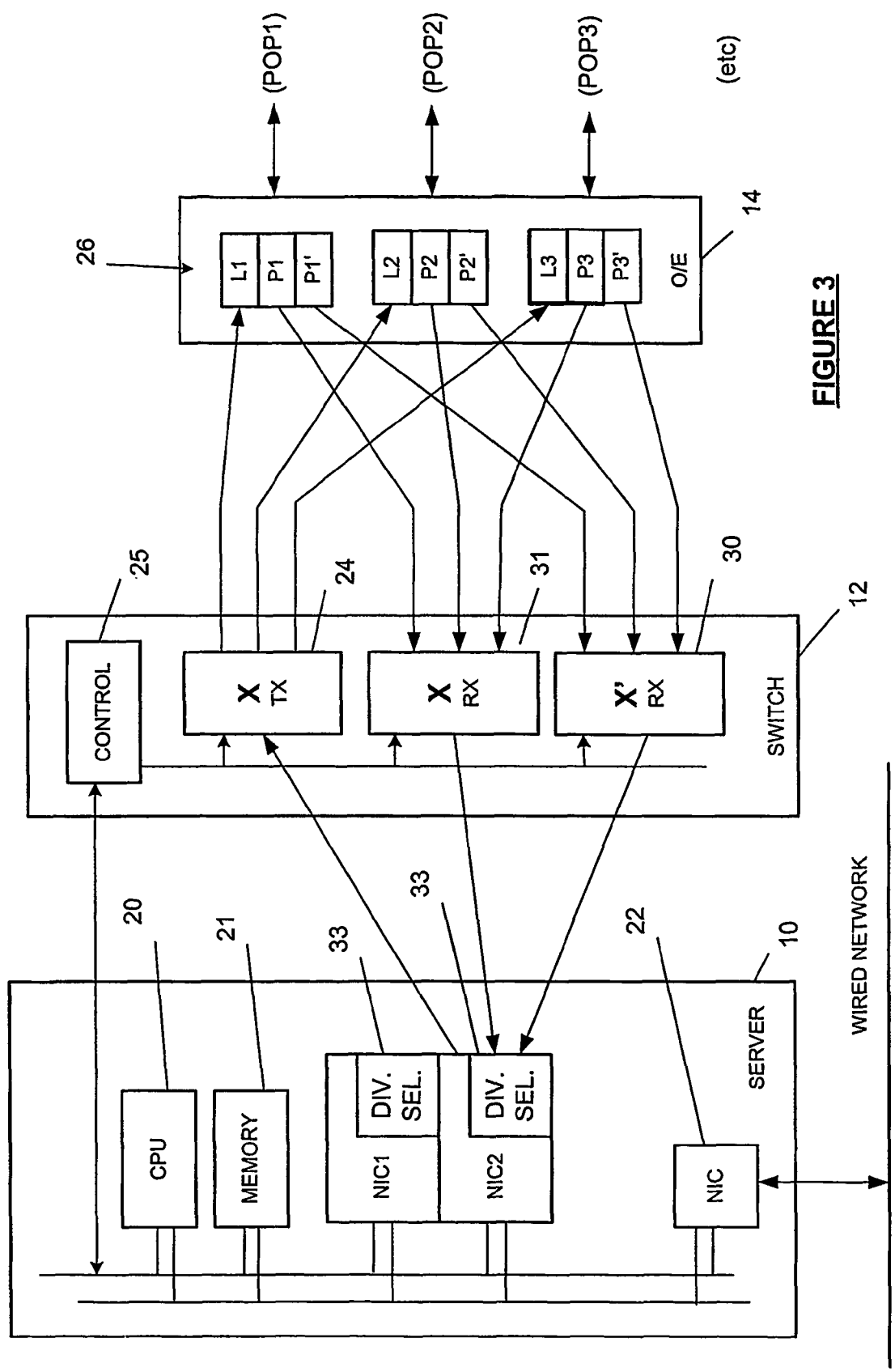
Figure 4:
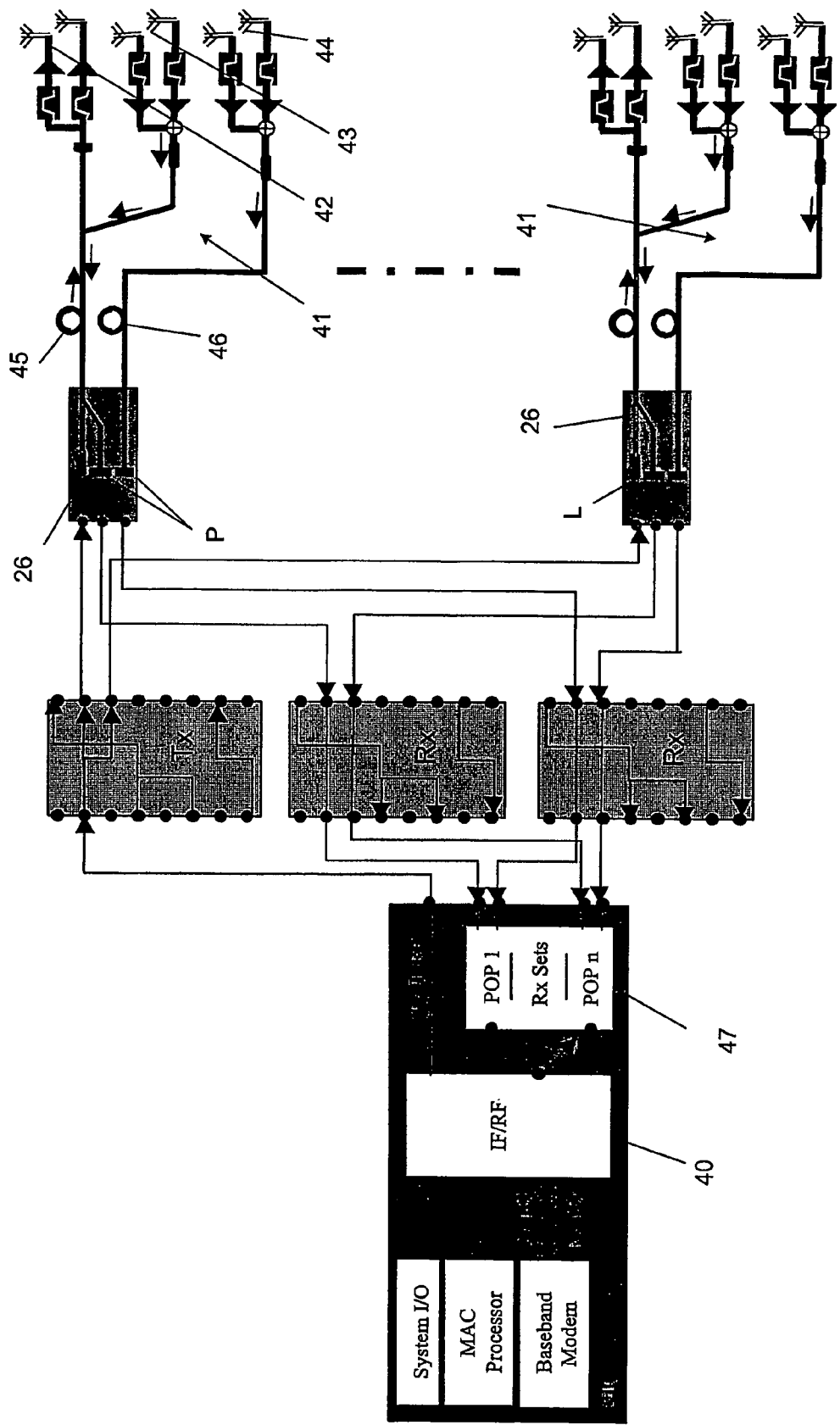
Figure 5:
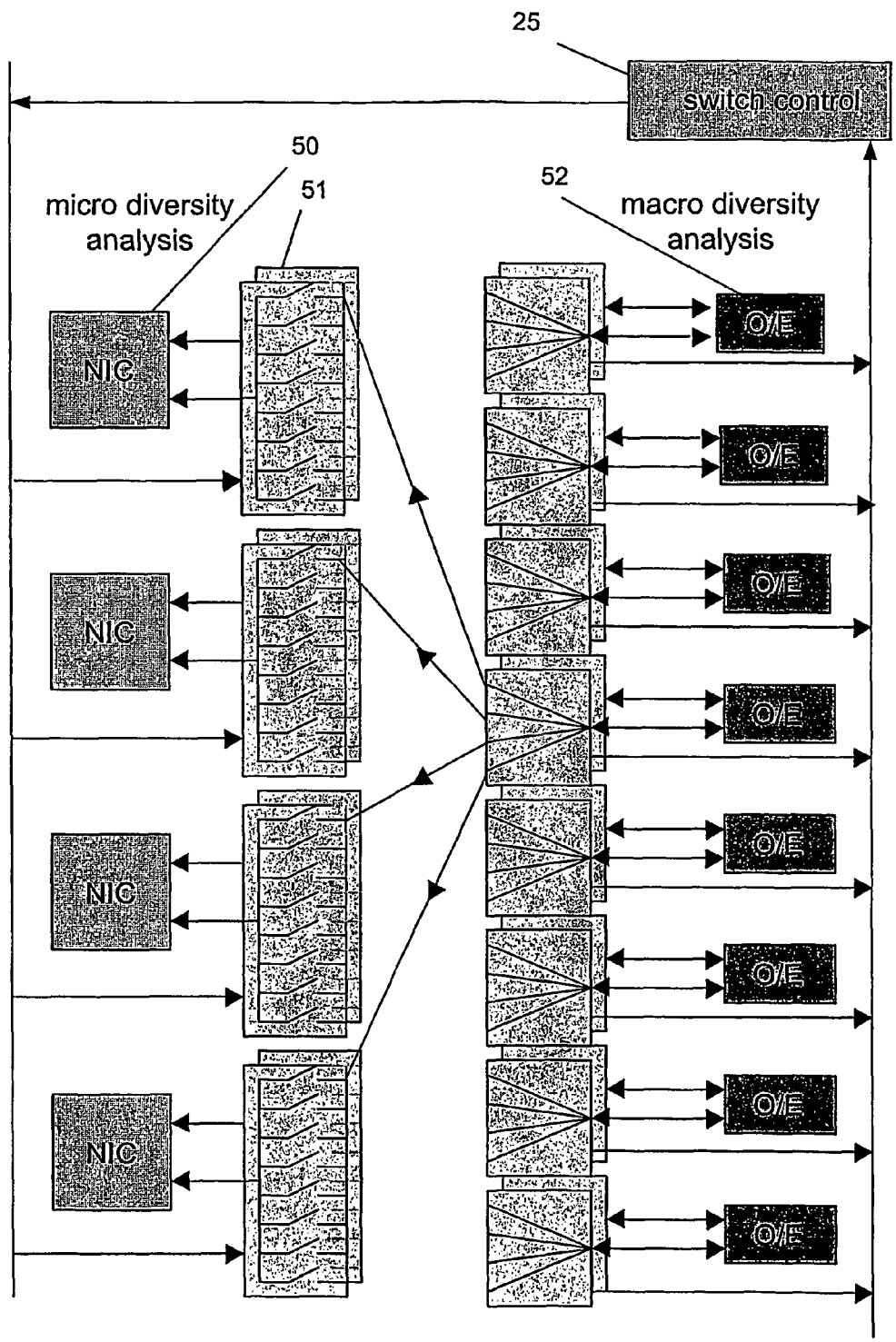
Figure 6:
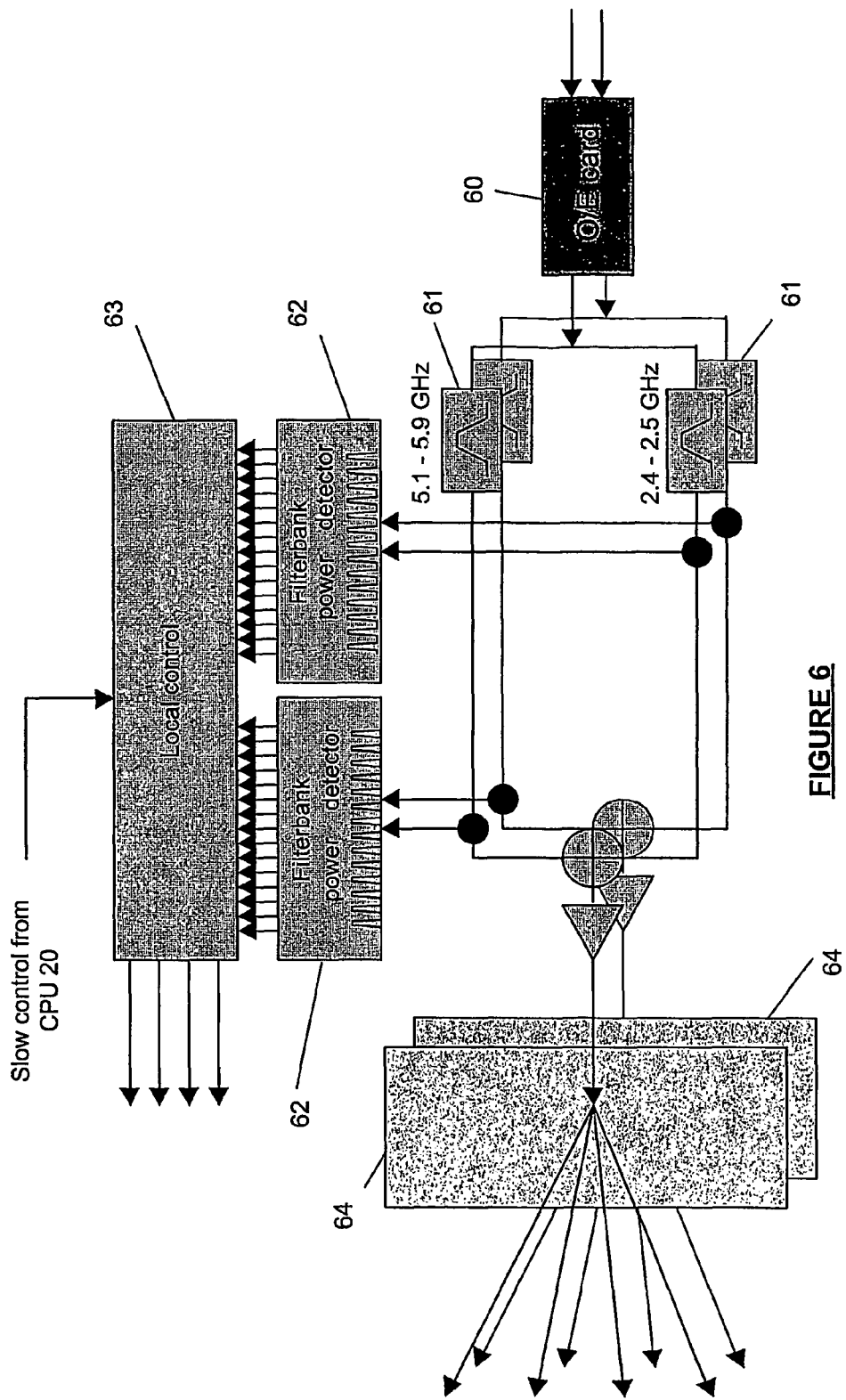

Preferred embodiments of the invention will be described with respect to the accompanying figures, of which:

FIG. 1 shows a prior art wireless network with a distributed access point,

FIG. 2 shows how macro diversity may be implemented in a distributed access point, FIG. 3 shows how micro diversity may be implemented in a distributed access point, FIG. 4 shows how both macro and micro diversity may be implemented in a distributed access point, FIG. 5 shows how macro and micro diversity may be alternatively implemented in a distributed access point, and FIG. 6 gives detail of the macro diversity selection in FIG. 5.

DESCRIPTION OF PREFERRED EMBODIMENTS

Referring to the drawings it will be appreciated that the invention can be implemented in a range of wireless networks in a range of different ways. The embodiments described here are given by way of example only.

FIG. 1 schematically shows part of a network serving a number of wireless terminals WT1-4 through a distributed access point. The access point includes a server 10 connected to a wired network 11 and to a number of points of presence POP1-3, being three in this example, each having RF transmit and receive antennas. Each POP represents a small cell site for radio communication. The server contains one or more controllers, commonly called NICs (network interface cards) that carry out various functions including conversion of signals between protocols and carriers used on the wired and wireless parts of the network. The controllers are connected to the POPs through a switch 12 that enables any one of the NICs to transmit and receive RF or IF signals through any one of the POPs. Each POP has a connection 13 to the switch, by way of optical fibre in this example, with RF signals being modulated and demodulated onto and from optical signals at each end of a fibre. A series of ports are provided for each of the POPs respectively in an optoelectronic module 14. Connections may also be made by a range of other means such as coaxial cable. The wireless terminals WT1-4 may communicate with each other, and with fixed terminals 15 or other wireless and fixed terminals in the network through the access point.

FIG. 2 schematically indicates how macro diversity techniques may be implemented among POPs at the distributed access point in FIG. 1. Server 10 includes two interface controllers NIC1-2, provided as cards, that enable communication with devices using any of a range of wireless protocols such as IEEE 802.11a and 802.11b, for example. The two NICs, a processor 20, memory 21 and network port 22 in the server are connected by address, data and control buses, shown in simple form for clarity. Processor 20 carries out a range of general functions for the access point, including frequency planning, power control, diagnostics and network management via SNMP (simple network management protocol) for example. Switch 12 preferably includes separate transmit and receive switching components 23 and 24 respectively, to reduce cross talk when transferring transmit and receive signals between the NICs and the POPs. Both switch components are set by a controller 25. Switch connections have been shown in simple form for NIC1 only. Opto-electronic module 14 includes a series of ports 26 for fibre optic connection to the POPs, each having an optical transmitter and an optical receiver, typically. lasers L1-3 and photodiodes P1-3 respectively. Outputs from the transmit switching component 23 are connected to the lasers L1-3.

Macro diversity in FIG. 2 is implemented by way of a selection system 27 connected between the opto-electronic module 14 and the receive switching component 24 of the switch 12. Outputs from the photodiodes P1-3 are connected to inputs of the receive switching component 24, with portions of the signals being passed through filters F1-3 respectively in the selection system. Output from each of the filters is connected to a detector 28. The signal received from a POP may contain individual signals representing separate communications on several channels in several bands. For example, a POP that is constructed to enable IEEE 802.11a and b will potentially receive signals on several channels in each of the 5.2 GHz and 2.4 GHz bands that have been defined for those standards. The filters F1-3 are therefore preferably narrowband per-channel filters and the detector 28 preferably has a separate power detector for each possible channel for each POP. Power or signal levels are preferably detected near the channel centres only, or pattern matched across multiple channels, to improve rejection of power from neighbouring channels. Various known diversity algorithms can be implemented by the selection system 27 for analysis of the signals from each POP, such as signal power, channel delay spread, channel matrix eigenvalue spread and preamble soft error magnitude. Output from the selection system 27 is used by the switch controller 25 to set pathways through the receive switching component, so that each NIC in the server 10 receives an optimum signal from a selected POP.

FIG. 3 schematically indicates how micro diversity techniques may be implemented in POPs at the distributed access point in FIG. 1. Many of the elements in this figure are the same or similar to those of FIG. 2. Switch connections have been shown in simple form for NIC2 only. Each POP now has more than one receive antenna and is able to provide two or more versions of the same signal to the server 10 through the switch 12. In this example, each POP has two receive antennas that provide signals to the opto-electronic module 14 along separate optical fibres. Each port 26 in the module 14 now includes an optical transmitter such as a laser L1-3, and two optical receivers such as a photodiode P1-3 and P1'-3'. Separate receive switching components 30, 31 are preferably provided in the switch 12, corresponding to the number of signals from each POP. The transmit and receive switching components are set by the controller 25. A diversity selection system 33 in each of the interface controllers NIC1-2 selects from the received signals from a particular POP. Both of the received signals from a particular POP are delivered to a particular NIC by the switch controller generally according to macro diversity techniques that may also be implemented. Various known diversity algorithms can be implemented by the selection systems 33 for analysis of the signals from each POP as mentioned above.

FIG. 4 shows schematically how a distributed access point combining both macro and micro diversity techniques may be implemented. Many of the elements common to the preceding figures have been omitted, while some extra detail has been included, and only a single NIC 40 has been shown. In this example, there are eight POPs 41 each with a transmit antenna 42 and two receive antennas 43, 44 enabling selection from eight channels for macro diversity and two channels for micro diversity. Each antenna may operate in multiple bands, covering both of the bands prescribed for IEEE 802.11 a and b, for example. Each POP is connected by optical fibres to an opto-electronic port 26 having a laser L for optical transmission and two photodiodes P, P' for optical reception. In this example, the outgoing signal to each POP shares an optical fibre 45 with one of the incoming signals from the POP, while a separate fibre 46 is provided for the other incoming signal. The POPs may also contain lasers, photodiodes, amplifiers, filters, frequency converters and optical multiplexers as required. The NIC carries out both macro and micro diversity selection, with all of the signals received from all of the POPs capable of being presented to the selection system 47. Some specific components of the NIC including an I/O port for connection to the server, a MAC processor for analysing packets received from wired or wireless terminals, a baseband modem for conversion of digital signals to and from quadrature form, and an RF or IF stage for modulation and demodulation of the quadrature signals onto high frequency carriers are also shown. Specific transmit and receive connections are also shown in the switch, again by way of example.

FIG. 5 shows an alternative implementation of macro and micro diversity in a distributed access point. Many of the elements common to the preceding figures have been omitted for simplicity, while some extra detail has been included. In this example there are again eight POPs each with two receive antennas, enabling macro and micro diversity selections from eight and two channels respectively. Four NICs 50 have now been shown with specific receive switching connections 51, and opto-electronic ports 52. Only a few of the total number of receive connections in the switch have been shown, while the transmit connections have been omitted altogether. The two receive switch components preferred for transfer of signals from each pair of receive antennas in the POPs are shown in overlay form. Macro diversity selection is carried out on the POP side of the switch by filters and power detectors in block 27 as in FIG. 2, with adjustment of the switch being carried out by control 25. Micro diversity selection is carried out by the NICs as in FIG. 3. Alternatively, both macro and micro diversity selection may be carried out on the POP side of the switch.

FIG. 6 gives some detail of the diversity selection system 27 in FIGS. 2 and 5. A pair of signals is input to the selection system from a POP having two receive antennas. The signals are received along an optical fibre by an O/E card 60 containing suitable opto-electronic components, typically photodiodes. Each signal from an antenna may contain component signals from a range of wireless terminals using a range of different protocols. In this case, the signals are broadly filtered 61 according to two prescribed bands, such as the 2.4 GHz and 5.1 GHz bands of the IEEE 802.11 standards. A portion of the signal in each band is then filtered by a respective bank of narrow band filters 62 covering each of the available channels. The power in each channel is determined and output as data to a local processor 63, generally part of the switch control 25. A control signal from the main processor 20 in the access server 10 in FIG. 2 is also usually received. Output from the local processor is used to determine the switch settings 51 in FIG. 5. The pair of signals are then passed through buffers 64. Diversity arrangements implemented according to the invention are able to achieve selection and switching on practical time scales. The selection process should generally take place as close as possible to the switching mechanism to reduce any delay in operating the switch. It is preferred that selection by macro diversity take place prior to switching and that selection by micro diversity take place after the switch. However, it will be appreciated that various combinations of diversity selection and switching will be appropriate in different networks.

The invention claimed is:

1. A communications network comprising:
   two or more points of presence for communication with wireless terminals, each point of presence represents a cell site, each point of presence having multiple receive antennas which provide diversity reception of wireless signals at the point of presence;
   a central site having one or more controllers, the one or more controllers comprise a selection system, the selection system carries out macro-diversity selection using a cell selector and micro-diversity selection using an antenna selector; and
   a switch system through which receive signals from each of the multiple receive antennas of each point of presence are connected to the selection system, wherein based on analysis, at the selection system at the central site, of the receive signals from each of the multiple receive antennas of each point of presence: (a) the cell selector performs the macro-diversity selection to counter macro spatial effects in the communications network, and selects one of the points of presence from the two or more points of presence for reception from a particular wireless terminal, and (b) the antenna selector performs the micro-diversity selection to counter micro spatial effects in the communications network, and selects one of the receive antennas of the multiple receive antennas of the selected point of presence, such that the antenna selector selects a micro-diversity channel from each point of presence from among at least two micro-diversity channels from each point of presence, and the cell selector selects a macro-diversity channel from among the selected micro-diversity channels.

2. A communications network according to claim 1, wherein:
   the switch system presents all receive signals from the multiple receive antennas at each point of presence to the selection system at the central site for use by the antenna selector in selecting the micro-diversity channel from each point of presence from among the at least two micro-diversity channels from each point of presence, and for use by the cell selector in selecting the macro-diversity channel from among the selected micro-diversity channels.

3. A communications network according to claim 1 wherein the one or more controllers include transceivers that transmit and receive RF signals according to different respective wireless LAN protocols that are used by different wireless terminals.

4. A communications network according to claim 1 wherein the central site is connected to the two or more points of presence via optical fibers, and each point of presence comprises an optical transmitter and an optical receiver.

5. A communications network according to claim 1, wherein the multiple receive antennas of each point of presence includes first and second receive antennas, the communications network further comprising, for each point of presence:
   a first electric-to-optical
   converter associated with the first receive antenna, and a second electric-to-optical converter associated with the second receive antenna;
   an optoelectronic port having at least first and second optical receivers;
   a first optical fiber coupled between the first optical receiver and the first electric-to-optical converter to carry a receive signal of the first receive antenna; and
   a second optical fiber coupled between the second optical receiver and the second electric-to-optical converter to carry a receive signal of the second receive antenna.

6. A communications network according to claim 5, wherein, for each point of presence, the antenna selector selects one of the receive antennas by selecting a signal from a set of signals which includes signals of the first and second optical receivers.

7. A communications network according to claim 5, further comprising, for each point of presence:
   a transmit antenna;
   an optical-to-electric converter associated with the transmit antenna; and
   an optical transmitter associated with the optoelectronic port;
   wherein the optical transmitter is coupled to the optical-to-electric converter of the transmit antenna to carry a transmit signal of the transmit antenna by sharing at least part of the first optical fiber with the receive signal of the first receive antenna.

8. A communications network according to claim 1, wherein:
   signals of the multiple receive antennas are received at the antenna selector; and
   the antenna selector selects the one receive antenna of the multiple receive antennas by selecting one of the signals of the multiple receive antennas and passing the selected one of the signals of the multiple receive antennas to the cell selector.

9. A communications network according to claim 1, wherein:
   the one or more controllers are provided in a network interface card.

10. A communications network according to claim 9, wherein:
    the network interface card comprises a MAC processor for analyzing packets received from each point of presence according to a wireless LAN protocol.

11. A communications network according to claim 10, wherein:
    the wireless LAN protocol is IEEE 802.11.

12. A communications network according to claim 1, further comprising:
    at least one network interface card, the at least one network interface card comprises the one or more controllers, a baseband modem for conversion of digital signals to and from quadrature form, a stage for modulation and demodulation of quadrature signals, and an input/output port for connection to a server.

13. A communications network according to claim 1, wherein:
    for each point of presence, the multiple receive antennas include first and second receive antennas which provide diversity reception of wireless signals at the point of presence in a first frequency band according to a first wireless LAN protocol, and third and fourth receive antennas which provide diversity reception of wireless signals at the point of presence in a second frequency band according to a second wireless LAN protocol.

14. A communications network according to claim 13, wherein:
the first wireless LAN protocol is IEEE 802.11a and the second wireless LAN protocol is IEEE 802.11b.

15. A communications network according to claim 13, wherein:
the first frequency band is a 5.2 GHz band, and the second frequency band is a 2.4 GHz band.

16. A communications network according to claim 13, wherein:
signals received by the first and third receive antennas are carried by a first optical fiber to an opto-electronic port; and
signals received by the second and fourth receive antennas are carried by a second optical fiber to the opto-electronic port.

* * * * *